(12) United States Patent
Alder et al.

(10) Patent No.: US 7,284,772 B2
(45) Date of Patent: Oct. 23, 2007

(54) COUPLING ASSEMBLY

(76) Inventors: Randall F. Alder, 3289 Horrell Ct., Fenton, MI (US) 48430; Mark R. Vogel, 43066 Avon Ct., Sterling Heights, MI (US) 48313; Douglas J. Clemens, 110 Cherry St., Stryker, OH (US) 43557; James A. Beyer, 4540 Sedona Dr., Clarkston, MI (US) 48348; Kenneth R. Fowler, 54230 Franklin Dr., Shelby Township, MI (US) 48316; Frank J. Zawodny, 2855 Hadley Rd., Lapeer, MI (US) 48446

( * ) Notice: Subject to any disclaimer, the term of this patent is extended or adjusted under 35 U.S.C. 154(b) by 177 days.

(21) Appl. No.: 11/011,353

(22) Filed: Dec. 14, 2004

(65) Prior Publication Data

US 2005/0156430 A1   Jul. 21, 2005

Related U.S. Application Data

(60) Provisional application No. 60/481,816, filed on Dec. 19, 2003.

(51) Int. Cl.
*F16L 37/00* (2006.01)

(52) U.S. Cl. .................. 285/316; 285/319; 285/308

(58) Field of Classification Search .......... 285/318, 285/319, 308, 316
See application file for complete search history.

(56) References Cited

U.S. PATENT DOCUMENTS

| | | | | |
|---|---|---|---|---|
| 798,795 A | * | 9/1905 | Itrich et al. | 285/316 |
| 2,690,918 A | * | 10/1954 | Holte | 285/277 |
| 4,026,581 A | | 5/1977 | Pasbrig | |
| 4,802,696 A | * | 2/1989 | Chohan et al. | 285/317 |
| 4,966,398 A | * | 10/1990 | Peterson | 285/319 |
| 5,098,136 A | | 3/1992 | Washizu | |
| 5,100,182 A | | 3/1992 | Norkey et al. | |
| 5,181,751 A | | 1/1993 | Kitamura | |
| 5,380,051 A | * | 1/1995 | Breuhan | 285/307 |
| 5,489,125 A | * | 2/1996 | Hohmann | 285/81 |
| 5,887,911 A | | 3/1999 | Kargula | |
| 6,390,511 B1 | | 5/2002 | Kargula | |
| 6,991,265 B2 | * | 1/2006 | Walmsley et al. | 285/316 |

* cited by examiner

*Primary Examiner*—David Bochna

(57) ABSTRACT

A coupling assembly includes a female member having a bore and a male member capable of being received in the bore of the female member. A trigger assembly is disposed between the male and female members and includes an actuator, housing, and biasing member. The male member includes an engagement mechanism to engage the trigger assembly and facilitate axial movement of the actuator. Axial movement of the actuator induces expansion of the biasing member and the engagement of the actuator and the male member. Accordingly, the male member is urged or propelled into the bore of the female member upon expansion of the biasing member. To disconnect, the male and female members are utilized to return the trigger assembly to an inactivated position.

28 Claims, 6 Drawing Sheets

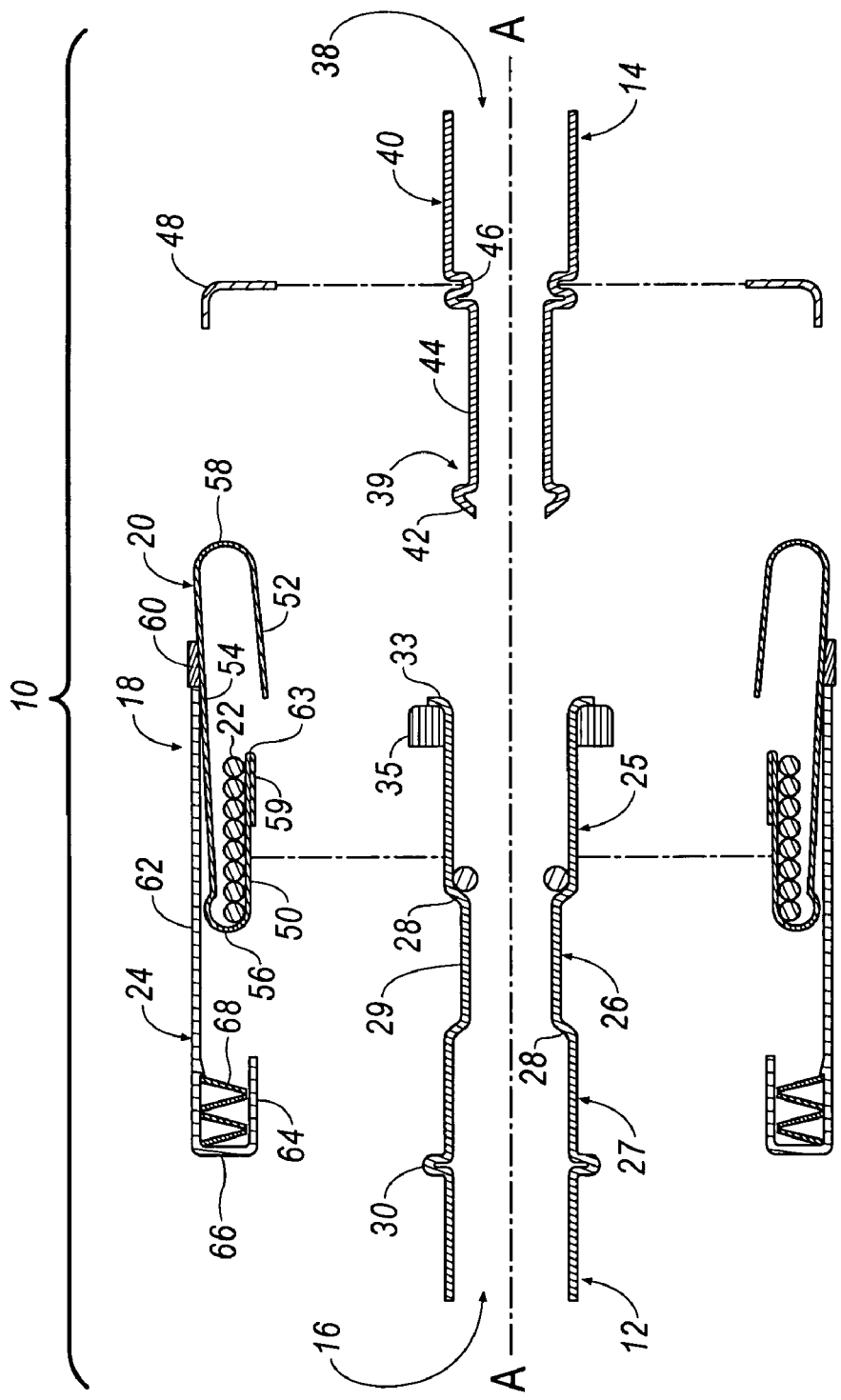

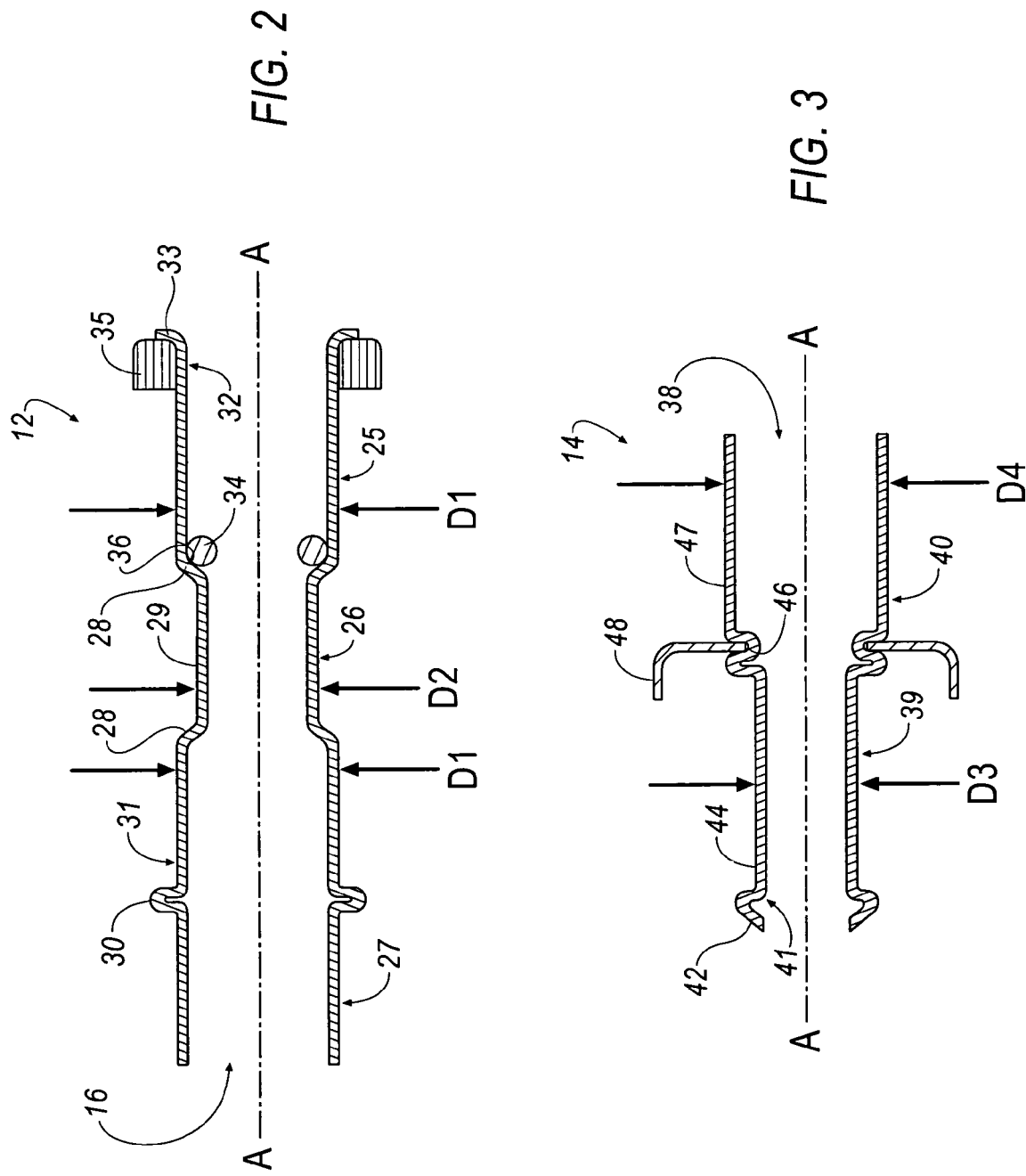

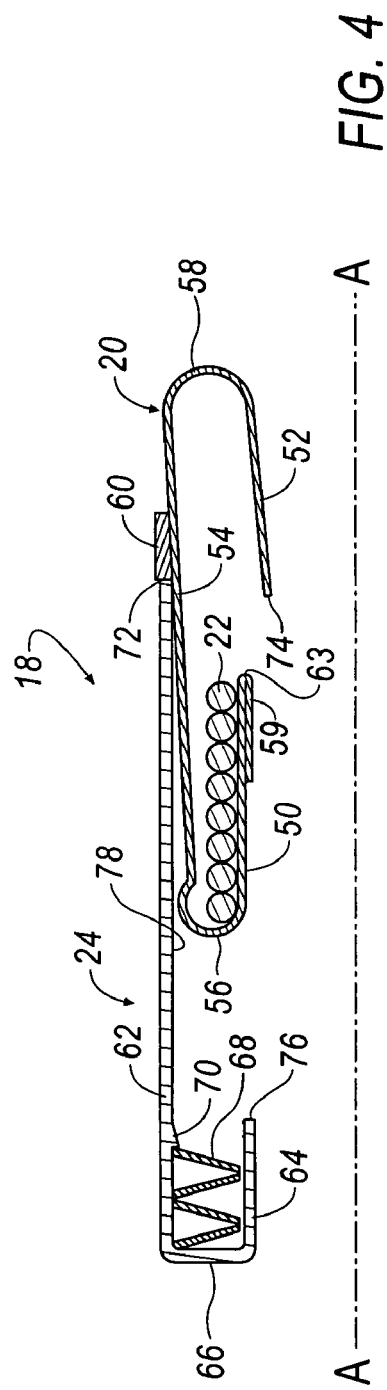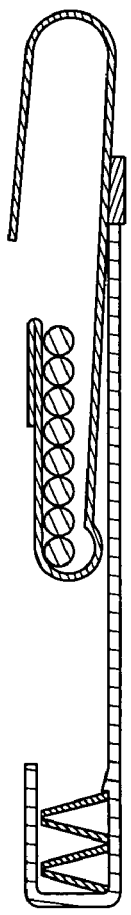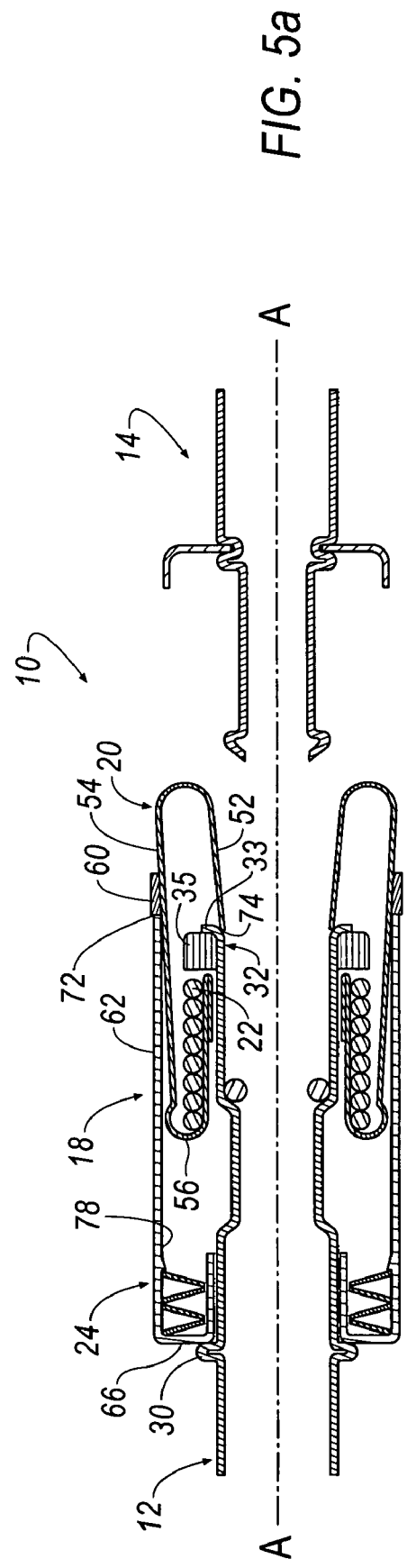
FIG. 4
FIG. 5a

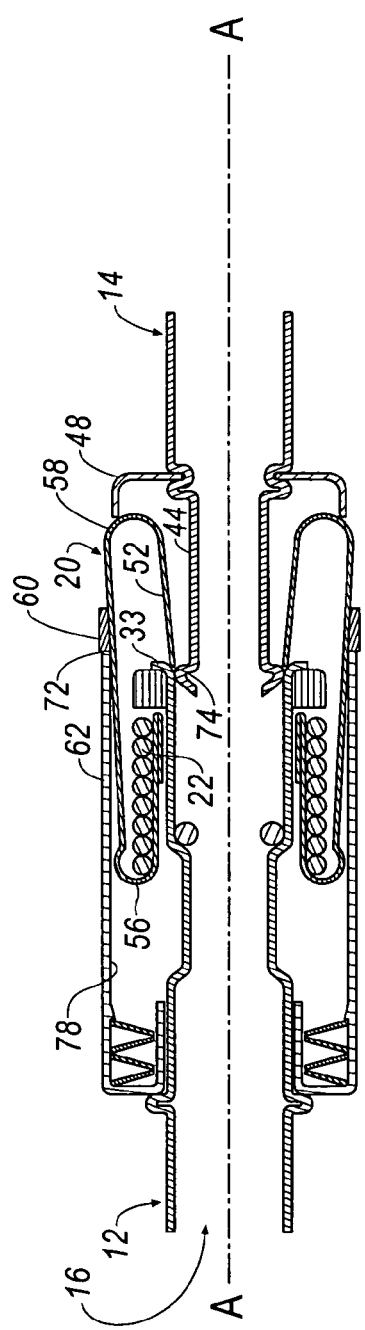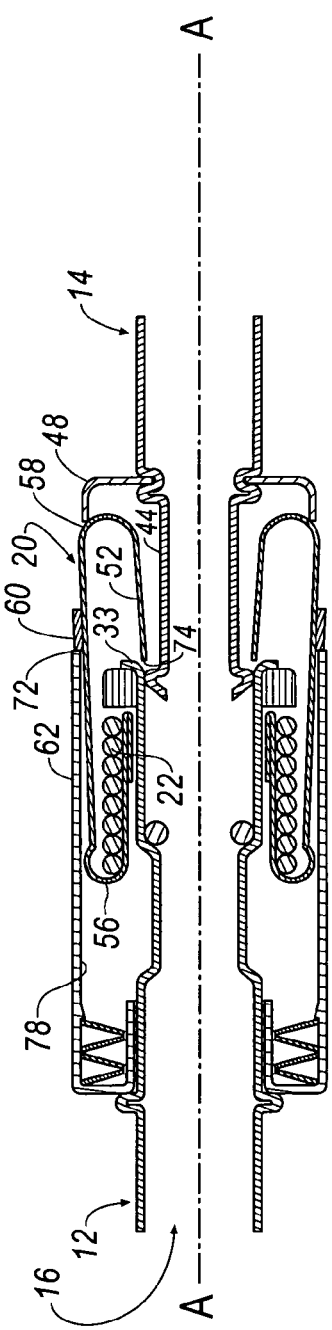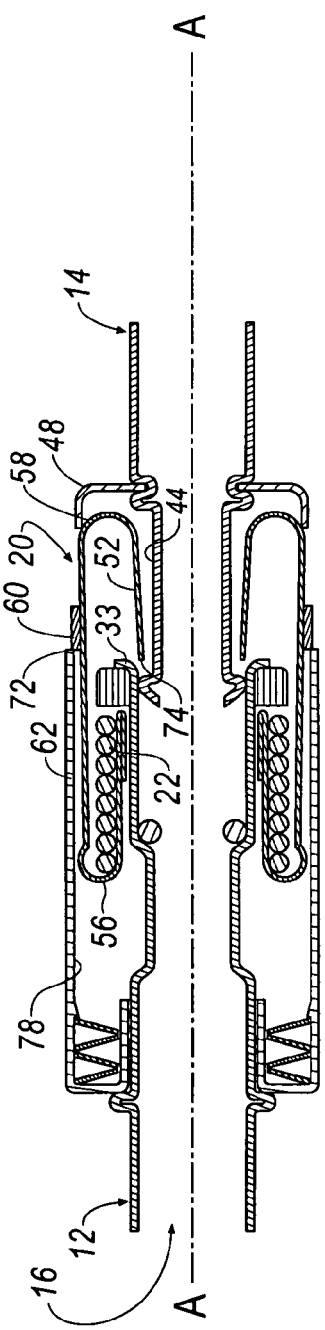

COUPLING ASSEMBLY

CROSS-REFERENCE TO RELATED APPLICATIONS

This application claims the benefit of U.S. Provisional Application No. 60/481,816 filed Dec. 19, 2003, the entire contents of which are herein incorporated by reference.

TECHNICAL FIELD

The present invention relates to a coupling assembly, and more particularly to a coupling assembly that propels a male member into a bore of a female member using a trigger assembly.

BACKGROUND

Couplings are commonly used to join hoses and tubes. Often these hoses and tubes transport fluids necessary for the effective operation of a machine such as an engine. In automotive applications, couplings are typically used in fuel lines, air conditioning systems, power steering and brake systems. Failure of the couplings results in leakage of the transported fluid and reduces the overall effectiveness of the machines or engines.

Couplings commonly fail for a variety of reasons. One of the most common failures is that the coupling is not properly connected during its initial assembly. An improper connection is often a result of the difficulty in determining when male and female members of the coupling are properly connected. Manufacturing environments are usually loud and present a multitude of distractions to the operators. The noises and distractions limit an operator's ability to see or hear a proper connection of the coupling. Thus, an improper connection of the coupling during the initial assembly of the machine or engine goes undetected.

Further, vibration and wear may also affect the stability of the coupling assembly during operation of the engine or machine. The coupling must withstand normal operating conditions within the engine or machine to maintain the connection between the male and female members and promote effective fluid transfer.

Therefore, a coupling that is essentially self-connecting to eliminate the need for an operator to see or hear the connection is greatly desired. The coupling must be cost effective to manufacture and simple to use. Further, the coupling must withstand wear and vibration within the machine or engine environment.

BRIEF SUMMARY

The embodiments described herein are directed to a coupling assembly comprising a female member having a bore, a male member and a biasing member. The male member cooperates with the female member to be received in the bore. The biasing member is disposed about the female member and engagement of the male and female members activates the biasing member and urges the male member into the bore of the female member.

BRIEF DESCRIPTION OF THE DRAWINGS

FIG. 1 is an exploded cross-sectional elevational view of a coupling assembly according to one embodiment of the invention;

FIG. 2 is a cross-sectional elevational view of a female member of the coupling assembly of FIG. 1;

FIG. 3 is a cross-sectional elevational view of a male member of the coupling assembly of FIG. 1;

FIG. 4 is a cross-sectional elevational view of a trigger assembly of the coupling assembly of FIG. 1;

FIGS. 5a-5f are cross-sectional elevational views of the coupling assembly of FIG. 1 illustrating connection of the male and female members;

DETAILED DESCRIPTION

Figure 5E:
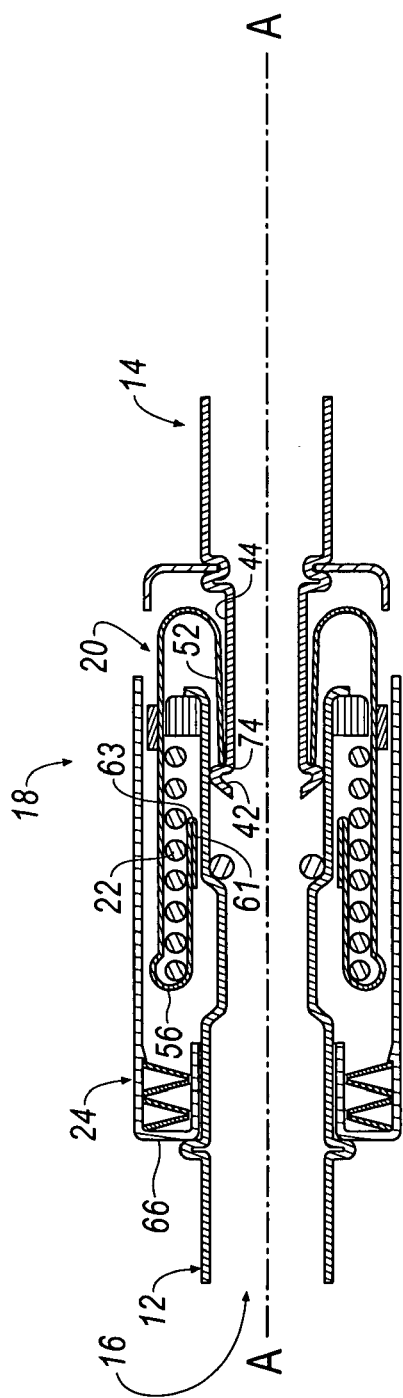

Referring to FIGS. 1-4, a coupling assembly is illustrated and generally referred to at 10. Coupling assembly 10 includes a female member 12 and a male member 14. Both members 12, 14 are generally tubular in the illustrated embodiment, although this is not a requirement. Female member 12 includes a bore 16 extending therethrough and defining a central axis A-A. Coupling assembly 10 is generally symmetrical about central axis A-A. Male member 14 is capable of being received in bore 16 of female member 12. Coupling assembly 10 also includes a trigger assembly 18 generally disposed between female member 12 and male member 14. Trigger assembly 18 is also generally tubular and, in the illustrated embodiment, is disposed about a portion of female member 12. Trigger assembly 18 includes a plurality of components, specifically an actuator 20, a first biasing member 22, and a housing 24.

An illustrated embodiment of the female member 12, shown in FIGS. 1 and 2, is generally tubular and includes bore 16 extending therethrough. It includes three sections, a receiving section 25, a reduced diameter section 26, and an outer section 27. As illustrated, receiving section 25 and outer section 27 have generally similar diameters $D_1$ while reduced diameter section 26 has a diameter $D_2$. $D_2$ is preferably less than $D_1$. Further, reduced diameter section 26 is positioned between receiving section 25 and outer section 27. Transition portions 28 join reduced diameter section 26 to receiving section 25 and outer section 27. Reduced diameter section 26 defines a groove 29 to receive a portion of actuator 20 of trigger assembly 18 when female and male members 12, 14 are connected.

Outer section 27 of female member 12 includes a radial boss 30 on an outer surface 31. Radial boss 30, as illustrated, is shown generally rounded. However, any shape extending radially outwardly from outer surface 31 of female member 12 is contemplated. The function of radial boss 30 will be further described below when describing the connection of female and male members 12, 14.

Furthermore, receiving section 25 includes a first end 32 having a generally curved lip 33. First end 32 defines the opening of bore 16 to receive male member 14 in receiving section 25. Lip 33 is curved radially outward in part to facilitate connection of female and male members 12, 14 and activation of trigger assembly 18. Additionally, a stop 35 is press-fit about female member 12 at first end 32. Lip 33 engages stop 35 to help retain it. However, any method for retaining stop 35 at the first end 32 is contemplated including providing various shaped protrusions (not shown) at first end 32, welding, gluing, or the like.

Further, disposed within bore 16 of female member 12 is a sealing ring 34. As illustrated, sealing ring 34 is generally positioned between reduced diameter section 26 and receiving section 25. Specifically, sealing ring 34 is nestled at a junction 36 between transition portion 28 and receiving section 25. Sealing ring 34 is positioned to form a seal between female member 12 and male member 14 when male member 14 is inserted into bore 16 of receiving section 25. Therefore, the location of reduced diameter portion 26 and sealing ring 34 is dependent upon the length of male member 14 to be received in receiving section 25. Sealing ring 34 is fixedly positioned within bore 16 by techniques commonly used by one skilled in the art.

As illustrated in FIGS. 1 and 3, male member 14 is also shown generally tubular and includes a bore 38 therethrough. Male member 14 includes two sections, a first insert section 39 and a second section 40 each having diameters $D_3$ and $D_4$, respectively. In one embodiment, diameter $D_3$ of first insert section 39 is less than diameter $D_4$ of second section 40. Accordingly, first insert section generally defines a recess 44. Recess 44 receives a portion of actuator 20 of trigger assembly 18 when female and male members 12, 14 are connected. Further, first insert section 39 includes a first end 41 having a generally angled and hooked-shape outer lip 42, wherein the base of the lip 42 defines a radially outer extent and the free end of the lip 42 defines a radially inner extent. First end 41 is received in receiving section 25 of female member 12 when members 12, 14 are connected. When connected, generally angled outer lip 42 contacts and compresses sealing ring 34 of female member 12 to form a seal between members 12, 14.

Further, second section 40 of male member 12 includes an annular groove 46 located on a radially outer surface 47. Groove 46 receives a generally L-shaped engagement mechanism 48 in accordance with one embodiment of the invention. One leg of engagement mechanism 48 may be press-fit in groove 46 while the other leg extends generally perpendicular to the first leg toward first end 41. However, any technique to secure engagement mechanism 48 in groove 46 is contemplated. Engagement mechanism 48 activates trigger assembly 18 as members 12, 14 are connected. Any acceptably shaped mechanism 48 that activates trigger assembly 18 is contemplated.

As illustrated in FIGS. 1 and 4, trigger assembly 18 includes actuator 20, first biasing member 22 and housing 24. As illustrated, actuator 20 includes a first leg 50 and a second leg 52 with a back 54 disposed therebetween. First leg 50 and back 54 define a generally arcuate first end 56 of actuator 20, while second leg 52 and back 54 define a generally arcuate second end 58. Second leg 52 is generally biased radially outwardly from back 54 at second end 58. Further, first leg 50 of actuator 20 includes a fold-over portion 59. Fold-over portion 59 includes a portion of first leg 50 folded back to form a thicker portion when compared to the remainder of first leg 50. Accordingly, an end 63 of first leg 50 is generally rounded to provide easier activation and removal of a safety latch during connection and disconnection of coupling assembly 10. The use of a fold-over portion 59 to form generally rounded end 63 is only one of the embodiments contemplated. Any technique facilitating a smoother activation and removal of the safety latch is contemplated.

Furthermore, as illustrated in one embodiment, back 54 includes a rib 60. Rib 60 is a generally rectangular projection extending radially outwardly from back 54 and away from legs 50, 52. While shown as a separate component secured to actuator 20 it may also be formed in a manner similar to boss 30. In other words, rib 60 may be integrally formed between first leg 50 and second leg 52 by molding, stamping, or the like. The function of rib 60 will be described below.

In accordance with embodiments described herein, actuator 20 is generally flexible or pivotable and biased outwardly about first end 56. Accordingly, actuator 20 is made from a generally flexible material such as spring steel. However, other materials or techniques that facilitate rotation of actuator 20 about first end 56 are contemplated.

Further, disposed within actuator 20 at first end 56 is first biasing member 22. As illustrated in one embodiment, first biasing member 22 is a compression spring. However, other biasing devices such as tension springs, coil springs, Belville washers and the like are also contemplated as appreciated by one skilled in the art. Movement of actuator 20 releases or compresses the first biasing member 22 against stop 35 of female member 12.

As illustrated, housing 24 is generally C-shaped in cross-section with a first arm 62 and a second arm 64 extending from a base 66 therebetween. A second biasing member 68, preferably Belville washers, is received within housing 24. However, as discussed above, other biasing devices such as tension springs, coil springs, compression springs and the like are also contemplated as appreciated by one skilled in the art. Second biasing member 68 is generally positioned proximate base 66 between first and second arms 62, 64. First arm 62 includes an embossment 70 extending radially inwardly and acting as a stop to keep second biasing member 68 within housing 24 and limit its expansion. However, as appreciated by one skilled in the art, any technique to position second biasing member 68 within housing 24 and prevent its expansion is contemplated.

It will be appreciated that trigger assembly 18 acts similarly to a spring clip, such as a type used in a safety pin mechanism. However, trigger assembly 18 illustrated herein is not limited to this specific configuration. Other mechanisms may also function as trigger assembly 18. By way of example, trigger assembly 18 may be designed to function similarly to a tumbler used with locks and keys, or may function similarly to a latch mechanism used in a mouse trap.

Now referring to FIGS. 5a-5f, the assembly and operation of coupling assembly 10 will be described herein. As illustrated in FIG. 5a, coupling assembly 10 includes disconnected female and male members 12, 14 and an inactivated trigger assembly 18. Specifically, first biasing member 22 is compressed by first end 56 of actuator 20 against stop 35. Rib 60 on back 54 of actuator 20 is engaged against a free end 72 of first arm 62 of housing 24. Alternatively, rib 60 may be positioned on an inner surface 78 of first arm 62. In the alternative embodiment back 54 includes a groove (not shown) to receive rib 60. Nevertheless, the engagement of actuator 20 with housing 24 urges base 66 of housing 24 against radial boss 30 of female member 12. Ultimately, the compression of first biasing member 22 is maintained by radial boss 30. Furthermore, in one embodiment the bias of actuator 20 generally outwardly about first end 56 is such that a free end 74 of second leg 52 of actuator 20 engages lip 33 at first end 32 of female member 12. The engagement of second leg 52 with lip 33 of female member 12 limits axial movement of actuator 20 and maintains compression of first biasing member 22. Accordingly, trigger assembly 18 is assembled and awaiting activation.

As seen in FIGS. 5b-5d, as male member 14 approaches female member 12 and is received in receiving section 25 of female member 12, generally L-shaped engagement mechanism 48 engages and encapsulates arcuate second end 58 of actuator 20. Continued axial movement of male member 14 along axis A-A flexes and pivots actuator 20 radially inwardly about first end 56 against its generally outward bias. Rib 60 is disengaged from contact with end surface 72 of first arm 62 of housing 24 and then slidingly engages inner surface 78 of first arm 62. Accordingly, actuator 20 is continually urged inwardly about first end 56 against its outwardly bias. Also, in one embodiment end surface 74 of second leg 52 is disengaged from contact with lip 33 of female member 12 as actuator 20 moves inwardly. Once rib 60 and second leg 52 are disengaged, compression forces acting upon first biasing member 22 are generally eliminated. Further, as actuator 20 continues to move inwardly, in one embodiment, second leg 52 of actuator 20 is at least partially received in recess 44 defined by first insert section 39 of male member 14.

As seen in FIG. 5e, once compression upon first biasing member 22 is generally eliminated, stored potential energy in the compression spring is released and first biasing member 22 expands against first end 56 of actuator 20. End surface 74 of second leg 52 of actuator 20 is received in recess 44 defined by first insert section 39 and selectively contacts lip 42 of male member 14. Expansion of first biasing member 22 axially moves actuator 20 toward base 66 of housing 24 and slides rib 60 along inner surface 78 of first arm 62 of housing 24. Accordingly, because second leg 52 is received in recess 44, axial movement of actuator 20 induces axial movement of male member 14 along axis A-A to connect members 12, 14. It is contemplated that connection of members 12, 14 will occur quite rapidly such that activation of trigger assembly 18 and expansion of first biasing member 22 will generally propel first insert section 39 of male member 14 into receiving section 25 of female member 12. The urging or propelling force of axially moving male member 14 into bore 16 of female member 12 is generally felt by an operator connecting members 12, 14.

Figure 5F:
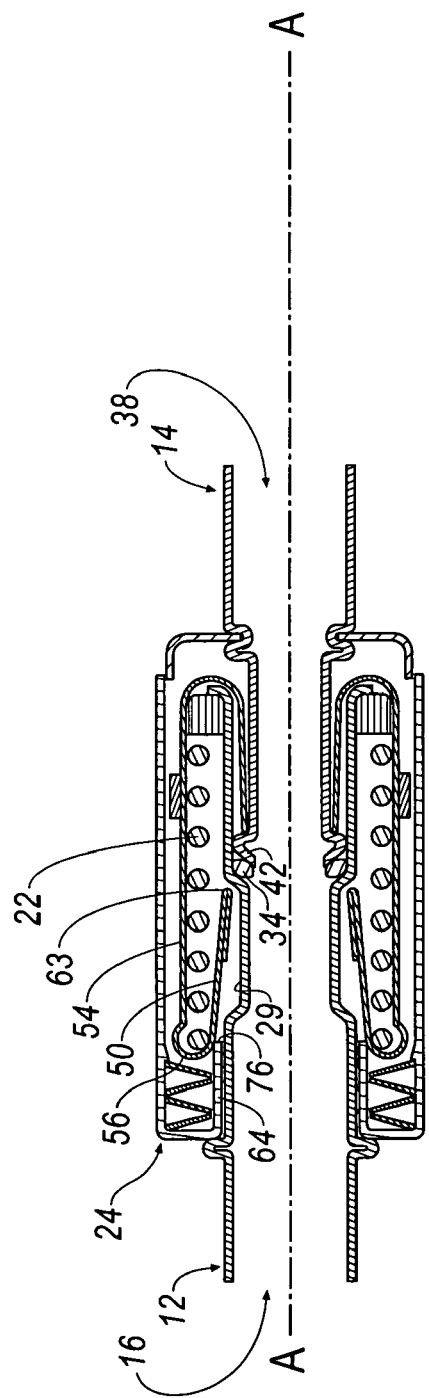

As seen in FIG. 5f, upon expansion of first biasing member 22 and axial movement of male member 14 into bore 16, members 12, 14 are connected. In one embodiment, first leg 50, being biased inwardly from back 54 at first end 56, is at least partially received in groove 29 defined by reduced diameter section 26 of female member 12. Generally rounded end 63 facilitates the smooth receipt of first leg 50 into groove 29. Further, first end 56 of actuator 20 generally engages an end surface 76 of second arm 64 of housing 24. Accordingly, further axial movement of actuator 20 is inhibited in one embodiment. However, retaining stop 35 at the first end 32 also inhibits further axial movement of actuator 20 in another contemplated embodiment. First leg 50 received in groove 29 functions as a safety latch to prevent reverse axial movement of actuator 20. Accordingly, the safety latch prevents the accidental disconnection of members 12, 14.

Further, when members 12, 14 are connected, the generally angled outer lip 42 of male member 14 contacts and compresses sealing ring 34 of female member 12. Accordingly, a seal is formed between the female and male members 12, 14 to prevent fluid from leaking from coupling assembly 10. The expansion of first biasing member 22 and axial movement of actuator 20 urges male member 14 within bore 16 to compress sealing ring 34. Additionally, the connection of members 12, 14 aligns bores 16, 38 of each member 12, 14. The connection forms a generally flush passageway for the effective transfer of fluids between female and male members 12, 14.

Figure 6A:
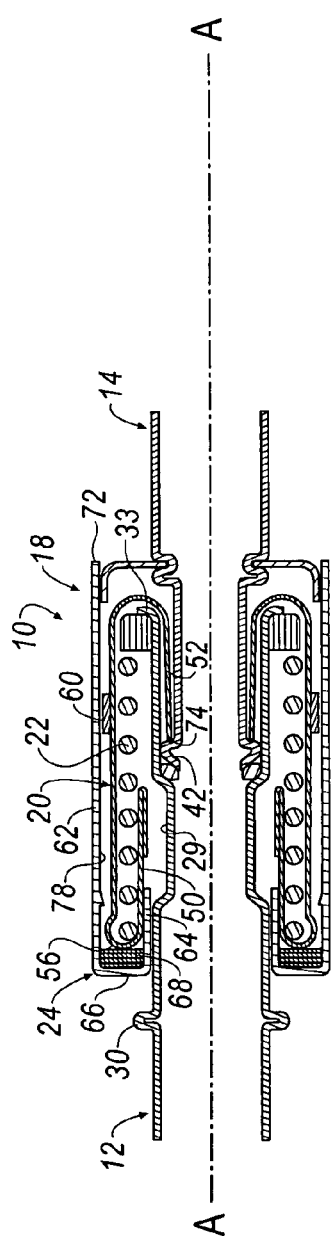
FIGS. 6a-6c are cross-sectional elevational views of the coupling assembly of FIG. 1 illustrating disconnection of the male and female members.
Figure 6B:
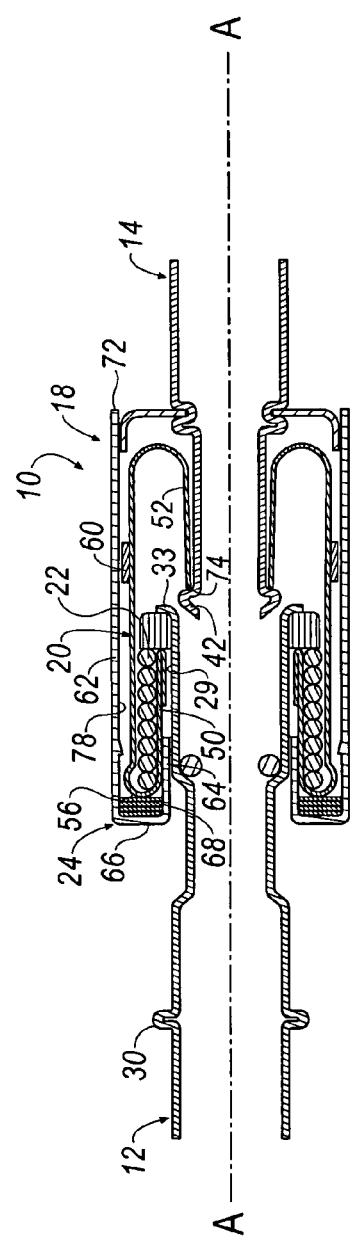
Figure 6C:
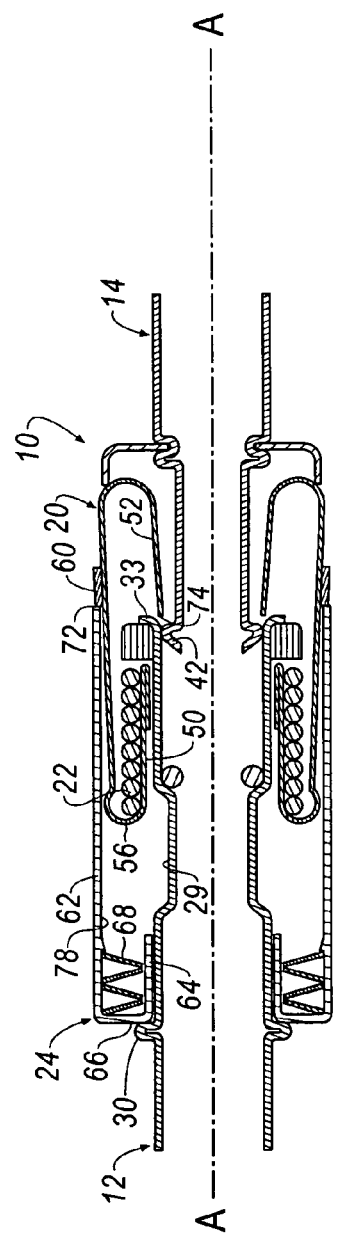

Now referring to FIGS. 6a-6c, the disconnection of female and male members 12, 14 of coupling assembly 10 will be described herein. Disconnection includes reverse axial movement of both housing 24 and male member 14. Reverse axial movement is in a direction generally opposite to the axial movement along axis A-A, which was used to connect members 12, 14.

First, housing 24 is moved in the reverse axial movement direction and second biasing member 68 is compressed against first end 56 of actuator 20. The reverse axial movement of housing 24 results in second arm 64 sliding between first leg 50 of actuator 20 and groove 29 of reduced diameter section 26 of female member 12. Accordingly, first leg 50 is urged outwardly against its inward bias to disengage from groove 29 and release the safety latch. Therefore, actuator 20 is released and moveable in the reverse axial direction thereby compressing first biasing member 22 against first end 56. Further, reverse axial movement of male member 14 urges lip 42 against end surface 74 of second leg 52 thereby also moving actuator 20 in the reverse axial direction to compress first biasing member 22.

Once first biasing member 22 is fully compressed, housing 24 is released from movement in the reverse axial direction and second biasing member 68 propels or urges housing 24 to its original position with base 66 engaging radial boss 30 of outer section 27 of female member 12. Accordingly, rib 60 is removed from sliding engagement with inner surface 78 of first arm 62 and actuator 20 pivots about first end 56 to return to its outwardly biased position. Rib 60 then reengages end surface 72 of first arm 62 and end surface 74 of second leg 52 reengages lip 33 of female member 12 to return trigger assembly 18 to the inactivated position. Accordingly, male member 14 is disconnected from female member 12.

It is to be understood that the above description is intended to be illustrative and not limiting. Many embodiments will be apparent to those of skill in the art upon reading the above description. The preceding description has been presented only to illustrate and describe exemplary embodiments of the methods and systems of the present invention. It is not intended to be exhaustive or to limit the invention to any precise form disclosed. The invention may be practiced otherwise than is specifically explained and illustrated without departing from its spirit or scope. The scope of the invention is limited solely by the following claims.

What is claimed is:

1. A coupling assembly comprising:
   a female member having a bore;
   a male member having a portion capable of being received in said bore; and
   a trigger assembly generally disposed about a portion of said female member and including a housing and a biasing member, wherein said biasing member selectively urges said male member into said bore of said female member and wherein said housing is axially moveable relative to said female member and wherein a leg portion of said trigger assembly is located between said female member and said male member.

2. A coupling assembly, as in claim 1, wherein said trigger assembly includes an actuator.

3. A coupling assembly, as in claim 2, wherein one of said actuator and said housing includes a projecting rib that engages the other one of said housing and said actuator.

4. A coupling assembly, as in claim 2, wherein said actuator is pivotable about a first end to activate said first biasing member.

5. A coupling assembly, as in claim 2, wherein a portion of said actuator engages said male member while said biasing member urges said male member into said bore of said female member.

6. A coupling assembly, as in claim 2, wherein a portion of said actuator engages said female member to limit axial movement of said actuator with respect to said female member.

7. A coupling assembly, as in claim 2, wherein said female member includes a radial boss that engages said housing to limit axial movement of said housing with respect to said female member.

8. A coupling assembly, as in claim 1, wherein said male member further includes an engagement mechanism, such that said engagement mechanism activates said trigger assembly.

9. A coupling assembly as in claim 8, wherein an outer surface of said male member includes a groove for receiving said engagement mechanism.

10. A coupling assembly, as in claim 9, wherein said engagement mechanism is a radially projecting generally L-shaped member received in said groove.

11. A coupling assembly, as in claim 1, wherein said female member includes a sealing ring disposed in said bore and said male member selectively compresses said sealing ring when coupled to said female member to generate a seal between said male and female members.

12. A coupling assembly, as in claim 1, wherein a bore of said male member is generally aligned with said bore of said female member.

13. The coupling assembly of claim 1, wherein axial movement of said housing disengages said male member from said female member.

14. The coupling assembly of claim 1, wherein said housing includes a second biasing member.

15. The coupling assembly of claim 14, wherein axial movement of said housing compresses said second biasing member.

16. A coupling assembly comprising:
a female member having a receiving section, a reduced diameter section and an outer section;
a male member having a first insert section and a second section, wherein said first insert section of said male member is capable of being received in said receiving section of said female member; and
a trigger assembly generally disposed about a portion of said female member and including a housing and a biasing member, wherein said biasing member urges said first insert section of said male member into said receiving section of said female member, wherein said housing is axially movable relative to said female member and wherein a leg portion of said trigger assembly is located between said female member and said male member.

17. A coupling assembly, as in claim 16, wherein said reduced diameter section is generally positioned between said receiving section and said outer section.

18. A coupling assembly, as in claim 16, wherein said trigger assembly includes an actuator.

19. A coupling assembly, as in claim 16, wherein said actuator is pivotable about a first end to activate said first biasing member.

20. A coupling assembly, as in claim 18, wherein a portion of said actuator engages said male member while said biasing member urges said first insert section of said male member into said receiving section of said female member.

21. A coupling assembly, as in claim 18, wherein a portion of said actuator engages said female member to limit axial movement of said actuator with respect to said female member.

22. A coupling assembly, as in claim 16, wherein said female member includes a sealing ring disposed at a junction between said reduced diameter section and said receiving section, wherein a lip of said first insert section of said male member compresses said sealing ring.

23. A coupling assembly, comprising:
a female member having a bore defining an axis;
a male member having a portion capable of being received in said bore of said female member;
a trigger assembly including an actuator, a biasing member and a housing, wherein said housing is axially moveable relative to said female member, wherein axial movement of said actuator induces activation of said biasing member and wherein a leg portion of said trigger assembly is located between said female member and said male member; and
a portion of said actuator being received by said male member such that activation of said biasing member urges said male member into said bore of said female member.

24. A coupling assembly, as in claim 23, wherein one of said actuator and said housing includes a projecting rib that engages the other one of said actuator or said housing.

25. A coupling assembly, as in claim 23, wherein said actuator is pivotable about a first end to facilitate axial movement of said actuator and activation of said biasing member.

26. A coupling assembly, as in claim 23, wherein said biasing member is a compression spring and activation of said biasing member induces axial movement of said actuator to facilitate expansion of said compression spring.

27. A coupling assembly, as in claim 23, wherein said male member includes an engagement mechanism that engages a portion of said actuator to pivot said actuator about a first end.

28. A coupling assembly, comprising:
a female member having a bore;
a male member having a portion capable of being received in said bore; and including an actuator, a housing, and a biasing member, wherein said biasing member selectively urges said male member into said bore of said female member, wherein said housing includes a second biasing member positioned within said housing, and wherein axial movement of said housing disengages said female and male members and compresses said second biasing member.

* * * * *